US006430927B2

(12) United States Patent
Uno et al.

(10) Patent No.: US 6,430,927 B2
(45) Date of Patent: Aug. 13, 2002

(54) MASTER CYLINDER

(75) Inventors: Fumiaki Uno, Kanagawa-ken; Shinji Kajiro, Yamanashi-ken, both of (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/725,758

(22) Filed: Nov. 30, 2000

(30) Foreign Application Priority Data

Nov. 30, 1999 (JP) .......................................... 11-341434

(51) Int. Cl.[7] .................................................. B60T 11/26
(52) U.S. Cl. ...................................................... 60/585
(58) Field of Search ................................... 60/585, 592

(56) References Cited

U.S. PATENT DOCUMENTS 4,133,178 A * 1/1979 Brooks, Sr. .................. 60/592

FOREIGN PATENT DOCUMENTS

GB         1153177 A   *  5/1969

* cited by examiner

*Primary Examiner*—Edward K. Look
*Assistant Examiner*—Thomas E. Lazo
(74) *Attorney, Agent, or Firm*—Wenderoth, Lind & Ponack, L.L.P.

(57) ABSTRACT

A reservoir flange portion is formed in a leg portion of a reservoir so as to protrude beyond a seal member in a direction of a cylinder body and to extend radially outward. An annular retaining member, which has an outer diameter larger than the outer diameter of the reservoir flange portion and an inner diameter smaller than the outer diameter of the reservoir flange portion, is interposed between an engaging surface of the reservoir flange portion of the reservoir and an engaging surface of the seal member. By this arrangement, retention of the reservoir relative to the seal member and the cylinder body is markedly improved by means of the retaining member having an outer diameter larger than the outer diameter of the reservoir flange portion.

8 Claims, 5 Drawing Sheets

MASTER CYLINDER

BACKGROUND OF THE INVENTION

The present invention relates to a master cylinder for supplying brake fluid to a brake apparatus.

The master cylinder of the above-mentioned type comprises, for example, a cylinder body 81, a reservoir 82 and seal members 83 as shown in FIG. 9. The cylinder body 81 is connected to an input member, such as a brake pedal, so as to supply a brake fluid to a brake apparatus (not shown) in a volume corresponding to an input from the input member. The reservoir 82 stores the brake fluid. The brake fluid in the reservoir 82 is supplied to a cylinder bore (not shown) in the cylinder body 81, if desired. When the reservoir 82 is mounted on the cylinder body 81, the seal member 83 seals a gap therebetween. Two cylindrical mount portions 84 are formed at an upper portion of the cylinder body 81 so as to communicate with the cylinder bore through passages. The reservoir 82 is mounted on the cylinder body 81 by attaching the cylindrical seal members 83 to respective inner circumferential surfaces of the mount portions 84 and fitting cylindrical leg portions 85 of the reservoir 82 into the seal members 83. In this state, the cylinder bore in the cylinder body 81 and the reservoir 82 are communicated with each other. As shown in FIG. 10, a mount opening 86 is formed in the mount portion 84 of the cylinder body 81, and a claw portion 87 extends radially inward from an inner circumferential surface of a distal end of the mount opening 86. The cylindrical seal member 83, which includes a stepped portion on an outer circumferential surface thereof, is inserted from the distal end of the mount opening 86 and retained in the mount opening 86. The seal member 83 comprises a first annular portion 88, a second annular portion 89 and a third annular portion 90 continuously and coaxially arranged in an axial direction of the seal member 83. The first annular portion 88 has an outer diameter larger than an inner diameter of the claw portion 87. The second annular portion 89 has an outer diameter smaller than the outer diameter of the first annular portion 88 and has an outer circumferential surface facing an inner circumferential surface of the claw portion 87. The third annular portion 90 has an outer diameter larger than the outer diameter of the second annular portion 89 and has an outer circumferential surface facing an inner circumferential surface of the mount opening 86 on a proximal side thereof relative to the claw portion 87. A flange portion 91 extends radially outward from an outer circumferential surface of a distal end portion of the leg portion 85.

An engaging surface 92 of the flange portion 91 of the reservoir 82 on a side of the seal member 83 and an engaging surface 93 of the claw portion 87 of the cylinder body 81 on a side the seal member 83 engage with each other through the seal member 83, so as to prevent separation of the reservoir 82 from the cylinder body 81 and the seal member 83.

However, when the engaging surface 92 of the flange portion 91 and the engaging surface 93 of the claw portion 87 are indirectly engaged with each other through the seal member 83, retention of the reservoir 82 relative to the cylinder body 81 and the seal member 83 is not secured. In conducting vacuum filling of the brake fluid into brake piping, when the pressure of the brake fluid exceeds a predetermined level or when an external force is applied to the reservoir 82 during the time the vacuum filling is conducted, there is a possibility of separation of the reservoir 82 from the cylinder body 81.

To retain securely the reservoir relative to the cylinder body, it has been attempted to use conventional retaining mechanisms which have been employed in various techniques relating to the master cylinder. For example, the reservoir and the cylinder body have been further connected at a connecting portion other than the leg portion and the mount portion, and there has been provided a retaining pin which extends through the connecting portion. As another example, there has been provided a mechanism in which a projecting portion is formed in the cylinder body so as to project toward the reservoir and a portion having a fit with an intermediate part of the projecting portion is formed in the reservoir, and a retaining ring is externally attached to these portions when they are in a fitted state.

However, when conventional retaining mechanisms such as those mentioned above (external attachment of the retaining pin or retaining ring) are simply used for securely retaining the reservoir relative to the cylinder body, a connecting portion other than the leg portion and the mount portion must be formed, resulting in a master cylinder having a complicated structure. Further, a cumbersome operation is required for attachment of the retaining pin or retaining ring. As a result, the cost of the master cylinder substantially increases.

SUMMARY OF THE INVENTION

In view of the above, the present invention has been made. It is an object of the present invention to provide a master cylinder in which retention of the reservoir relative to the cylinder body and the seal member can be secured, without occurrence of a substantial increase in cost.

In order to achieve the above-mentioned object, the present invention provides a master cylinder comprising: a master cylinder body; a reservoir connected to the master cylinder body; a leg portion formed in the reservoir so as to protrude toward the master cylinder body; a mount portion formed in the master cylinder body so as to protrude toward the reservoir, the mount portion including an opening into which the leg portion is inserted; and a seal member adapted to be interposed between the leg portion and the mount portion when the leg portion is inserted into the opening of the mount portion, so as to seal a gap between the master cylinder body and the reservoir. The leg portion extends beyond the seal member and includes a flange portion formed along an outer circumference of a distal end thereof. The flange portion protrudes outward and includes an engaging surface facing the seal member. The seal member includes an engaging surface formed at an end portion thereof. The engaging surface of the seal member faces the flange portion. The master cylinder further comprises a retaining member adapted to be fitted on an outer circumferential surface of the leg portion. The retaining member is provided between the engaging surface of the flange portion and the engaging surface of the seal member so as to prevent separation of the reservoir from the master cylinder body.

In a preferred embodiment of the present invention, the retaining member has an outer diameter which is larger than an outer diameter of the flange portion and an inner diameter which is smaller than the outer diameter of the flange portion when the retaining member is provided between the engaging surface of the flange portion and the engaging surface of the seal member. By this arrangement, the reservoir is engaged with the retaining member having an outer diameter larger than the outer diameter of the reservoir flange portion. Consequently, retention of the reservoir relative to the cylinder body and the seal member can be strongly secured.

Further, such a strong retention can be achieved at the connection between the leg portion and the mount portion which are provided for permitting communication between the reservoir and the cylinder body. Therefore, the structure of the master cylinder does not become complicated. Further, the retaining member can be interposed between the seal member and the reservoir flange portion by preliminarily disposing the retaining member within the opening of the mount portion of the cylinder body and attaching the seal member to the mount portion, followed by fitting the leg portion of the reservoir into the retaining member and the seal member by a single fitting operation. Therefore, the reservoir can be easily mounted on the cylinder body.

The foregoing and other objects, features and advantages of the present invention will be apparent from the following detailed description and appended claims taken in connection with the accompanying drawings.

DETAILED DESCRIPTION OF THE INVENTION

Figure 1:
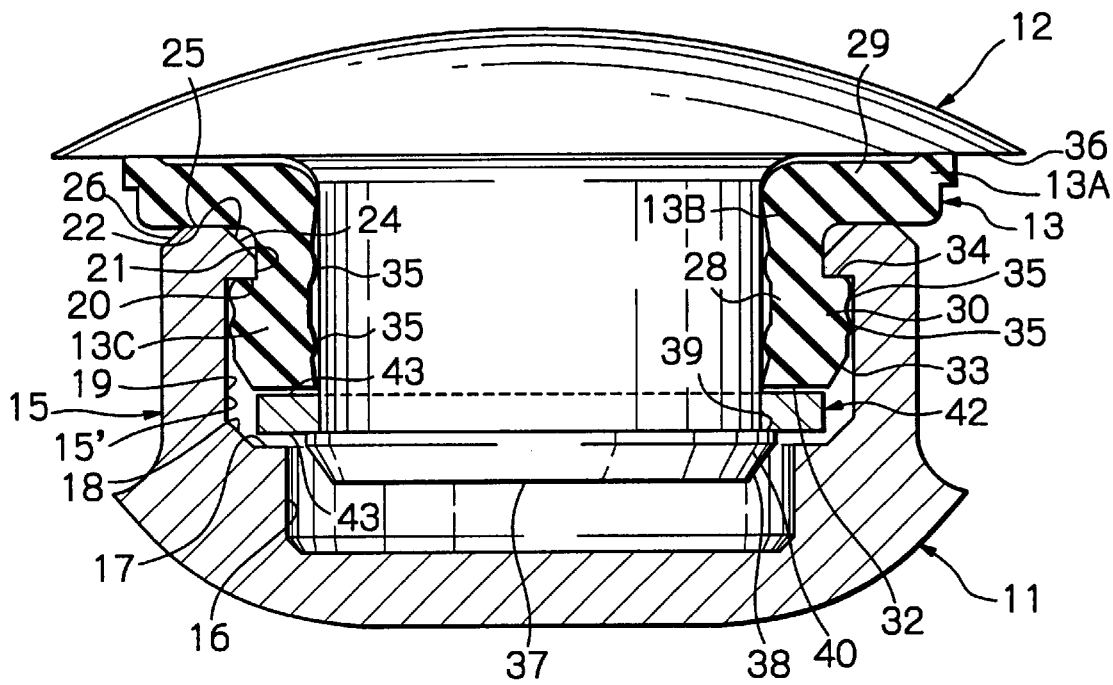
FIG. 1 is an enlarged cross-sectional view of a part of a master cylinder according to a first embodiment of the present invention.
Figure 2:
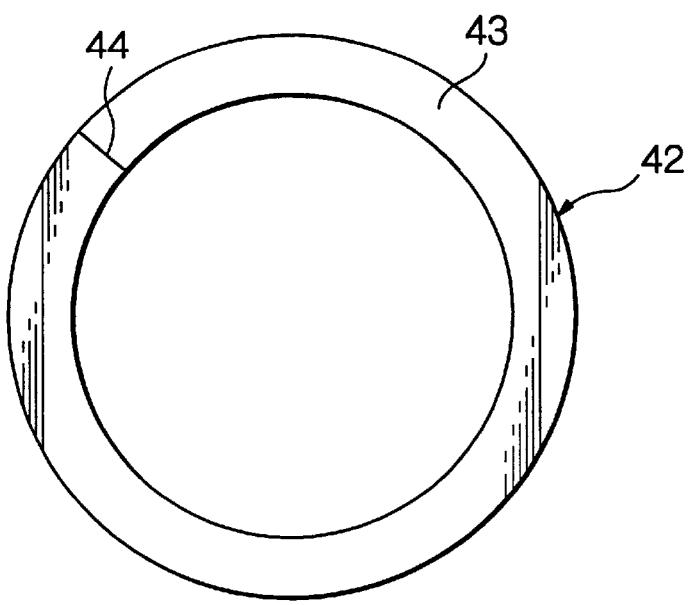
FIG. 2 is a plan view of a retaining member used in the master cylinder according to the first embodiment of the present invention.

Referring to FIGS. 1 and 2, description is made with regard to a master cylinder according to a first embodiment of the present invention. The master cylinder in this embodiment comprises, for example, a cylinder body 11, a reservoir 12 and a seal member 13. The cylinder body 11 is connected to an input member, such as a brake pedal, so as to supply a brake fluid to a brake apparatus (not shown) in a volume corresponding to an input from the input member. The reservoir 12 stores the brake fluid. The brake fluid in the reservoir 12 is supplied to the cylinder body 11, if desired. When the reservoir 12 is mounted on the cylinder body 11, the seal member 13 seals a gap therebetween.

A substantially cylindrical mount portion 15 is formed at an upper portion of the cylinder body 11. A mount opening 15' of the mount portion 15 has an inner wall surface in a stepped form. That is, the inner wall surface of the mount opening 15' comprises: a first inner circumferential surface 16; a stepped surface 17; a tapered surface 18; a second inner circumferential surface 19; a perpendicular surface 20; a third inner circumferential surface 21; and an inner chamfer 22, which are arranged in this order from a lower position (proximal portion) to an upper position (distal open end portion) of the mount portion 15. The first inner circumferential surface 16 extends in an axial direction of the mount portion 15. The stepped surface 17 extends from an upper end of the first inner circumferential surface 16 radially outward and perpendicularly to the axis of the mount portion 15. The tapered surface 18 is inclined from an outer-diameter side of the stepped surface 17 so as to have a diameter increasing in a direction of an upper portion thereof. The second inner circumferential surface 19 extends from an upper end of the tapered surface 18 in the axial direction of the mount portion 15. The perpendicular surface 20 extends from an upper end of the second inner circumferential surface 19 radially inward and perpendicularly to the axis of the mount portion 15. The third inner circumferential surface 21 extends from an inner-diameter side of the perpendicular surface 20 in the axial direction of the mount portion 15. The inner chamfer 22 is inclined from an upper end of the third inner circumferential surface 21 so as to have a diameter increasing in a direction of an upper portion thereof. The perpendicular surface 20, the third inner circumferential surface 21 and the inner chamfer 22 provide an outer surface of an annular inner claw portion 24 extending radially inward from a distal end of the mount portion 15.

An upper end of the inner chamfer 22 provides an upper end of the mount portion 15 and is connected to an end face 25 extending perpendicular to the axis of the mount portion 15.

An outer chamfer 26 is inclined from the upper end of an outer-diameter side of the mount portion 15 so as to have a diameter decreasing in a direction of an upper portion thereof.

The seal member 13 comprises a cylindrical elastic member of which an outer circumferential surface is stepped in an axial direction thereof. The seal member 13 generally comprises three portions which are formed coaxially and continuously in the axial direction of the seal member 13, namely, a first annular portion 13A having an outer circumferential surface having a diameter larger than an inner diameter of the inner claw portion 24, a second annular portion 13B having an outer diameter smaller than the outer diameter of the first annular portion 13A and having an outer circumferential surface facing an inner circumferential surface of the inner claw portion 24 and a third annular portion 13C having an outer diameter larger than the outer diameter of the second annular portion 13B and facing the inner circumferential surface 19 of the mount opening 15' on a proximal side thereof relative to the inner claw portion 24. Thus, the seal member 13 comprises the first annular portion 13A, the second annular portion 13B and the third annular portion 13C. The second annular portion 13B and the third annular portion 13C of the seal member 13 provide a cylindrical seal portion 28 having an outer circumferential surface in a stepped form.

An end portion (the first annular portion 13A) of the seal member 13 provides an annular flange portion 29 protruding radially outward. The other end portion (the third annular portion 13C) of the seal member 13 provides an annular engaging flange portion 30 extending radially outward. A distal end surface of the seal member 13 on a side where the engaging flange portion 30 is formed (an axial end face of the third annular portion 13C on a side of an opening of the seal member 13) provides an engaging surface 32. In a state in which the seal member 13 is attached to the mount opening 15', the engaging surface 32 extends substantially perpendicularly to the axis of the seal member 13. That is, the engaging surface 32 provides a surface intersecting the axis of the seal member 13. An outer-diameter side of the engaging surface 32 is connected to an outer circumferential surface of the engaging flange portion 30 through a chamfer 33, of which an outer circumferential surface has a diameter increasing in a direction for axial separation from the engaging surface 32. The outer circumferential surface of the engaging flange portion 30 is connected to a stepped surface formed between the third annular portion 13C and the second annular portion 13B due to a difference in outer diameter therebetween. This stepped surface provides an engaging surface 34 extending substantially perpendicularly to the axis of the seal member 13 (that is, providing a surface intersecting the axis of the seal member 13) when the seal member 13 is attached to the mount opening 15'. Further, a plurality of annular ribs 35 are formed on an inner circumferential surface of the cylindrical seal portion 28 and the outer circumferential surface of the engaging flange portion 30.

The seal member 13 is attached to the cylinder body 11 by fitting the second annular portion 13B and the third annular portion 13C of the cylindrical seal portion 28 into the mount opening 15' of the mount portion 15 in a coaxial relationship with each other and bringing a stepped surface of the flange portion 29 (or the first annular portion 13A) on a side connected to the second annular portion 13B into contact with the end face 25 of the mount portion 15. In this state, the engaging surface 34 of the engaging flange portion 30 is engaged with the perpendicular surface 20 of the inner claw portion 24. Consequently, movement of the seal member 13 relative to the cylinder body 11 is restricted.

The reservoir 12 includes a substantially cylindrical leg portion 37 protruding vertically from a lower surface 36. An annular reservoir flange portion 40 extends radially outward from an outer-diameter side of a distal end (lower end) of the leg portion 37. The reservoir flange portion 40 includes a chamfer 38 inclined so as to have a diameter decreasing toward the distal end of the leg portion 37 and an engaging surface 39 extending from an outer-diameter side of the chamfer 38 perpendicularly toward the axis of the leg portion 37. The reservoir 12 is attached to the cylinder body 11 by attaching the seal member 13 to the mount opening 15' of the mount portion 15 in the above-mentioned manner, followed by fitting the leg portion 37 into the seal member 13 so that the lower surface 36 is brought into contact with the seal member 13. In this state, the leg portion 37 in the mount opening 15' of the cylinder body 11 extends beyond the seal member 13 and the reservoir flange portion 40 is positioned on an inner proximal side of the mount opening 15' relative to the seal member 13. In this state, the cylinder body 11 and the reservoir 12 are communicated with each other.

In the first embodiment of the present invention, the reservoir 12 is connected to the cylinder body 11 through the seal member 13, and an annular retaining member 42 is provided between the engaging surface 39 of the reservoir flange portion 40 on a side of the seal member 13 and the engaging surface 32 of the seal member 13 on a side of the cylinder body 11. The retaining member 42 has an inner diameter and an outer diameter. The inner diameter of the retaining member 42 is equal to an inner diameter of the engaging surface 39 of the reservoir flange portion 40. That is, the inner diameter of the retaining member 42 is smaller than an outer diameter of the engaging surface 39 of the reservoir flange portion 40. The outer diameter of the retaining member 42 is larger than the outer diameter of the engaging surface 39 of the reservoir flange portion 40 [in other words, the outer diameter (the maximum outer diameter) of the retaining member 42 is larger than the maximum outer diameter of the reservoir flange portion 40 (that is, the outer diameter of the engaging surface 39) and the inner diameter (the minimum inner diameter) of the retaining member 42 is smaller than the maximum outer diameter of the reservoir flange portion 40 (that is, the outer diameter of the engaging surface 39)].

The retaining member 42 is made of a spring material. Axially opposite end faces 43 extend perpendicularly to the axial direction. The retaining member 42 is cut by a single slit 44 (FIG. 2) which radially extends through the retaining member 42.

Next, explanation is made with regard to a method for mounting the reservoir 12 on the cylinder body 11.

Initially, the retaining member 42 is inserted into the mount portion 15 of the cylinder body 11 and is placed on the stepped surface 17.

Subsequently, the seal member 13 is attached to the cylinder body 11 by fitting the cylindrical seal portion 28 into the mount portion 15 and bringing the flange portion 29 into contact with the end face 25 of the mount portion 15. Consequently, the engaging surface 34 of the engaging flange portion 30 is engaged with the perpendicular surface 20 of the inner claw portion 24, thus preventing separation of the seal member 13 from the cylinder body 11. In this state, the retaining member 42 is interposed between the engaging surface 32 on a distal end of the seal member 13 and the stepped surface 17 of the cylinder body 11.

Then, the leg portion 37 of the reservoir 12 is fitted into the seal member 13. In this instance, the reservoir flange portion 40 of the leg portion 37 passes through the seal member 13 while effecting elastic deformation of the seal member 13 in a radially outward direction thereof by means of the chamfer 38. When the reservoir flange portion 40 of the leg portion 37 exits the seal member 13, the seal member 13 is restored due to the elasticity thereof. The reservoir flange portion 40 of the leg portion 37 further advances through the retaining member 42 placed on the stepped surface 17, while effecting elastic deformation of the retaining member 42 in a radially outward direction thereof so as to open the slit 44. When the reservoir flange portion 40 exits the retaining member 42 of the reservoir flange portion 40, the retaining member 42 is restored due to the elasticity thereof, thereby closing the slit 44. Consequently, the retaining member 42 is positioned between the engaging surface 39 of the reservoir flange portion 40 on a side of the seal member 13 and the engaging surface 32 of the seal member 13 on a side of the cylinder body 11.

Thus, the reservoir 12 is mounted on the cylinder body 11. When the reservoir 12 is mounted on the cylinder body 11, the engaging surface 39 of the reservoir flange portion 40 abuts against the retaining member 42 and is engaged with the engaging surface 32 on the distal end of the seal member 13 by means of the area of the surface of the retaining member 42, thus retaining the reservoir 12 against external force acting in an upward direction and a lateral direction.

In the master cylinder in the first embodiment, the annular retaining member 42, which has an outer diameter larger than the outer diameter of the reservoir flange portion 40 and an inner diameter smaller than the outer diameter of the reservoir flange portion 40, is interposed between the engaging surface 39 of the reservoir flange portion 40 of the reservoir 12 and the engaging surface 32 of the seal member 13. Therefore, the reservoir 12 is engaged with the seal member 13 by means of the retaining member 42 having an outer diameter larger than the outer diameter of the reservoir flange portion 40. Consequently, retention of the reservoir 12 relative to the seal member 13 and the cylinder body 11 is markedly improved. Further, retention is improved at the connection between the leg portion 37 and the mount portion 15 which are provided for permitting communication between the reservoir 12 and the cylinder body 11. Therefore, it is unnecessary to provide a connecting portion other than the leg portion 37 and the mount portion 15, and the structure of the master cylinder does not become complicated. Further, the retaining member can be interposed between the seal member and the reservoir flange portion by preliminarily disposing the retaining member within the opening of the mount portion of the cylinder body and attaching the seal member to the mount portion, followed by fitting the leg portion of the reservoir into the retaining member and the seal member by a single fitting operation. Therefore, the reservoir can be easily mounted on the cylinder body. Further, separation of the reservoir 12 can be substantially prevented by means of the retaining member 42. Therefore, the outer diameter of the reservoir flange portion 40 can be reduced and the resistance imparted by the seal member 13 during insertion of the reservoir flange portion 40 can be suppressed, leading to easy mounting of the reservoir 12 on the cylinder body 11.

Therefore, the retention of the reservoir 12 relative to the cylinder body 11 and the seal member 13 in made very secure without the occurrence of a substantial increase in cost.

In the first embodiment, the retaining member 42 is an annular member which includes the slit 44 and has an outer diameter larger than the outer diameter of the reservoir flange portion 40 and an inner diameter smaller than the outer diameter of the reservoir flange portion 40. Needless to say, "the outer diameter of the retaining member 42" in this arrangement means that diameter when the reservoir 12 is mounted on the cylinder body 11. The outer diameter of the retaining member 42 when the reservoir 12 is not mounted on the cylinder body 11 may not necessarily be larger than the outer diameter of the reservoir flange portion 40. The outer diameter of the retaining member 42 can be equal to or smaller than the outer diameter of the reservoir flange portion 40, as long as the above-mentioned arrangement can be achieved by opening the slit 44 in a circumferential direction of the retaining member when the reservoir 12 is mounted on the cylinder body 11.

Figure 3:
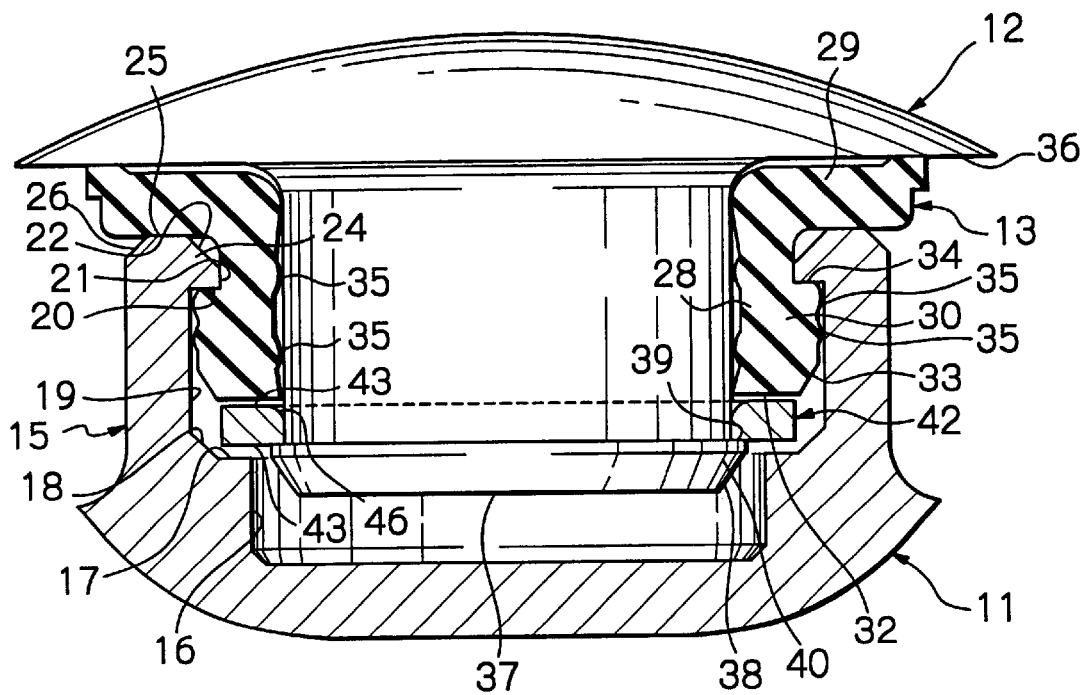
FIG. 3 is an enlarged cross-sectional view of a part of a master cylinder according to a second embodiment of the present invention.
Figure 4:
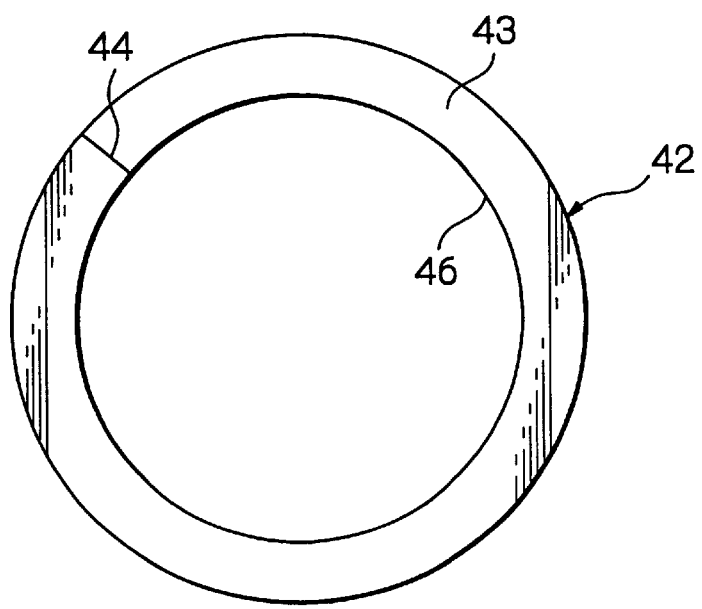
FIG. 4 is a plan view of a retaining member used in the master cylinder according to the second embodiment of the present invention.

Next, referring to FIGS. 3 and 4, a master cylinder according to a second embodiment of the present invention is described, mainly with respect to portions thereof different from those in the first embodiment. The same portions as those in the first embodiment are designated by the same reference numerals and characters, with overlapping explanation thereof being omitted.

In the second embodiment, the retaining member 42 is partially different in shape from that in the first embodiment.

That is, a chamfer 46 is formed on an inner-diameter side of one of the end faces 43 of the retaining member 42. The chamfer 46 has a diameter decreasing toward the other end face 43. The retaining member 42 is positioned so that the chamfer 46 is located on a side of the reservoir 12. It should be noted that the chamfer 46 is formed so as to have an arcuate form in section.

In the master cylinder of the second embodiment, the retaining member 42 is inserted into the mount portion 15 of the cylinder body 11 and placed on the stepped surface 17 so that the chamfer 46 faces upward. Then, the seal member 13 is attached to the cylinder body 11 in the same manner as in the first embodiment, and the leg portion 37 of the reservoir 12 is fitted into the seal member 13 and the retaining member 42. During fitting, after the reservoir flange portion 40 passes through the seal member 13, the chamfer 38 of the reservoir flange portion 40 abuts against the chamfer 46 of the retaining member 42 and passes through the retaining member 42 while effecting elastic deformation of the retaining member 42 in the radially outward direction thereof, thereby opening the slit 44. When the reservoir flange portion 40 exits the retaining member 42, the retaining member 42 is restored so as to close the slit 44, as in the case of the first embodiment. In this state, the end face 43 on a side where the chamfer 46 is not formed engages the engaging surface 39 of the reservoir flange portion 40.

Thus, the chamfer 46 is formed at a portion to be brought into contact with the reservoir flange portion 40 of the retaining member 42 when the reservoir flange portion 40 passes through the retaining member 42. Therefore, the reservoir flange portion 40 smoothly passes through the retaining member 42.

Therefore, resistance imparted by the retaining member 42 during insertion of the reservoir flange portion 40 can be reduced, making it easy to mount the reservoir 12 on the cylinder body 11.

Figure 5:
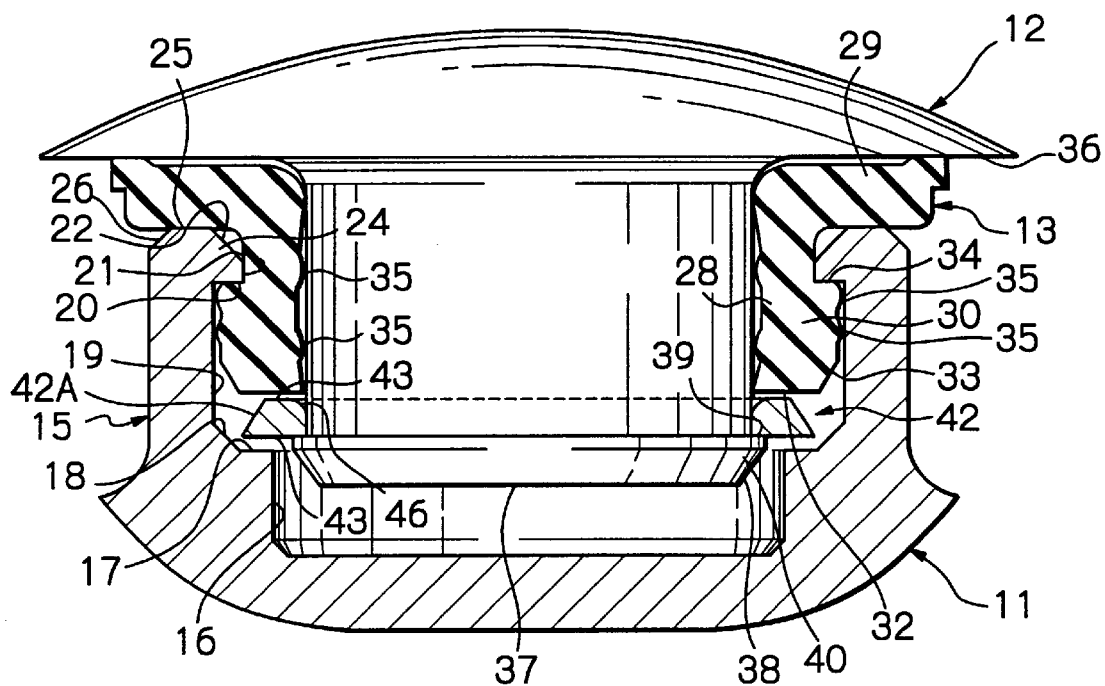
FIG. 5 is an enlarged cross-sectional view of a part of the master cylinder according to the second embodiment of the present invention, showing a modified example of the retaining member.

With respect to the retaining member 42 in the second embodiment, as shown in FIG. 5, the outer diameter of the end face 43 on a side of the seal member 13 may be made smaller than the outer diameter of the end face 43 on a side of the reservoir flange portion 40, to thereby form a tapered surface 42A on an outer circumferential surface of the retaining member 42 due to a difference in outer diameter between the end faces 43.

Figure 6:
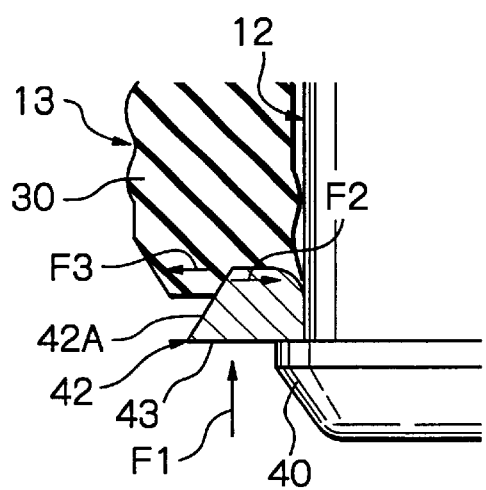
FIG. 6 is an enlarged cross-sectional view of a part of the master cylinder according to the second embodiment of the present invention, indicating a direction of a force acting on the retaining member.

In this arrangement, as shown in FIG. 6, when a force F1 acts on the reservoir 12 in a direction for separation from the cylinder body 11, the force F1 can be changed to a force F2 acting in a direction from the seal member 13 to the retaining member 42 and a force F3 acting in a direction from the retaining member 42 to the seal member 13. The force F2 acts so as to decrease the diameter of the retaining member 42 and prevent separation of the retaining member 42 from the reservoir flange portion 40. The force F3 acts so as to increase the diameter of the seal member 13 and prevent separation of the seal member 13 from the cylinder body 11. Due to such a wedging action, retention of the reservoir 12 relative to the cylinder body 11 and the seal member 13 can be very secure.

Figure 7:
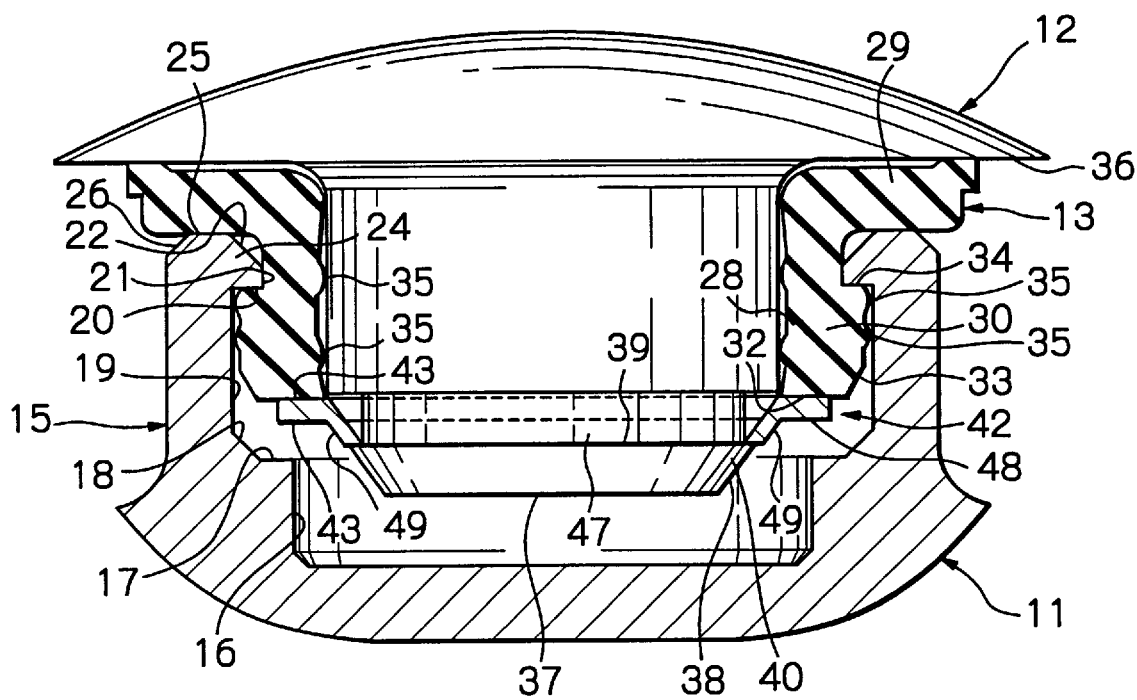
FIG. 7 is an enlarged cross-sectional view of a part of a master cylinder according to a third embodiment of the present invention.
Figure 8:
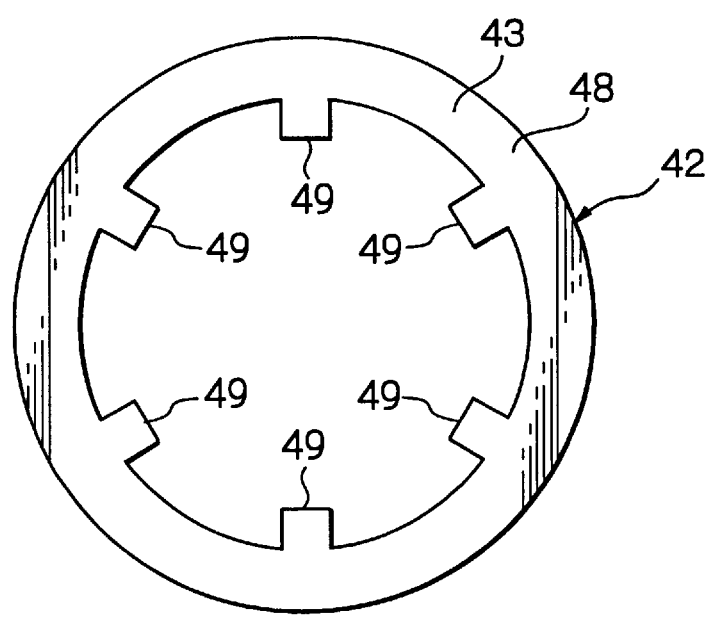
FIG. 8 is a plan view of a retaining member used in the master cylinder according to the third embodiment of the present invention.
Figure 9:
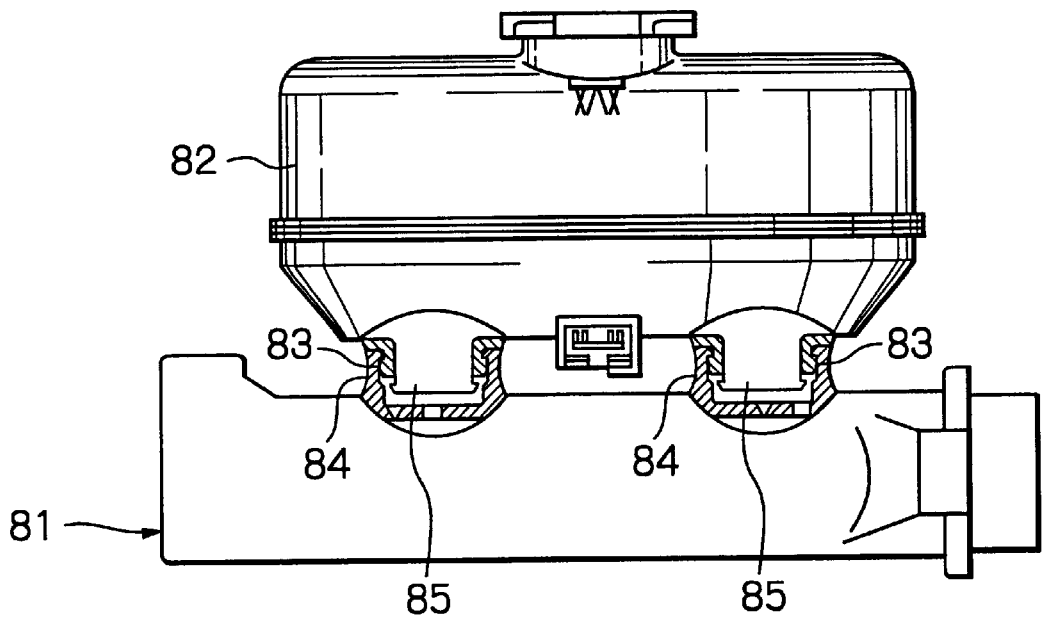
FIG. 9 is a side view, partially in section, of a master cylinder in related techniques.
Figure 10:
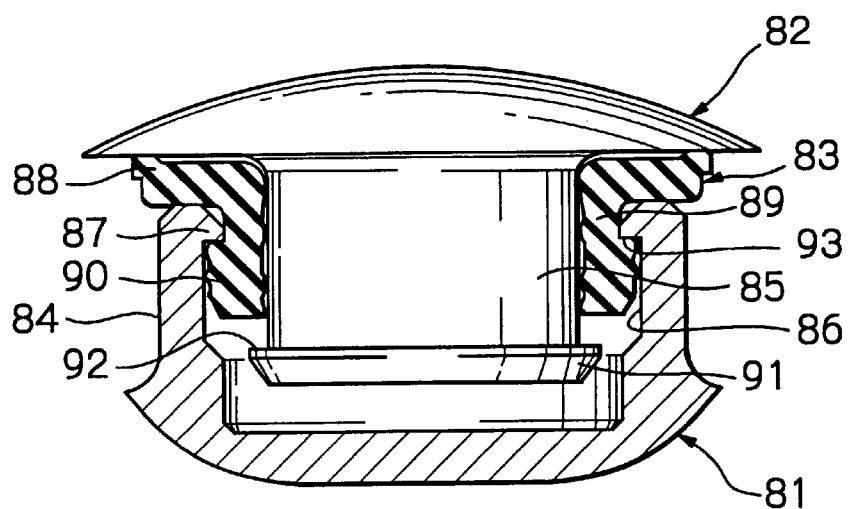
FIG. 10 is an enlarged cross-sectional view of a part of the master cylinder in related techniques.

Next, referring to FIGS. 7 and 8, a master cylinder according to a third embodiment of the present invention is described, mainly with respect to portions thereof different from those in the first embodiment. The same portions as those in the first embodiment are designated by the same reference numerals and characters, with overlapping explanation thereof being omitted.

In the third embodiment, the leg portion 37 of the reservoir 12 and the retaining member 42 partially differ in shape from those in the first embodiment. That is, an annular recess 47 is formed at a distal end portion of the leg portion 37. The recess 47 provides the engaging surface 39 of the reservoir flange portion 40. The retaining member 42 in the third embodiment comprises an annular body portion 48 and a plurality of engaging pieces 49 circumferentially arranged at predetermined intervals (for example, at regular intervals) on an inner-diameter side of the body portion 48. No slit is formed in the retaining member 42. The engaging pieces 49 are inclined to the same side in the axial direction and extend radially inward, thereby forming a bowl-like configuration. As in the case of the first embodiment, the inner diameter of the retaining member 42, which is defined as the diameter of a circle formed by a line connecting distal ends of the engaging pieces 49 when the reservoir 12 is mounted on the cylinder body 11, is equal to the inner diameter of the engaging surface 39 of the reservoir flange portion 40 or smaller than the outer diameter of the reservoir flange portion 40. An outer diameter of the body portion 48 is larger than the outer diameter of the reservoir flange portion 40. In other words, the maximum outer diameter of the retaining member 42 is larger than the maximum outer diameter of the reservoir flange portion 40 and the minimum inner diameter of the retaining member 42 is smaller than the maximum outer diameter of the reservoir flange portion 40.

In the master cylinder in the third embodiment, the retaining member 42 is inserted into the mount portion 15 of the cylinder body 11 and the body portion 48 is placed on the stepped surface 17 so that the engaging pieces 49 are located at a lower position. Then, in the same manner as in the first embodiment, the seal member 13 is attached to the mount portion 15, and the leg portion 37 of the reservoir 12 is fitted into the seal member 13 and the retaining member 42. In this instance, the reservoir flange portion 40 passes through the seal member 13 by means of the chamfer 38 and the chamfer 38 makes contact with the engaging pieces 49 of the retaining member 42 which extend obliquely downward in a bowl-like configuration. The chamfer 38 passes through the retaining member 42 while effecting elastic deformation of the engaging pieces 49 in the radially outward direction. After the reservoir flange portion 40 exits the retaining member 42, the engaging pieces 49 are restored due to the elasticity thereof and engage the engaging surface 39 of the reservoir flange portion 40.

Thus, in the retaining member 42, the engaging pieces 49, arranged in a bowl-like configuration, are formed at a portion to be brought into contact with the reservoir flange portion 40 when the reservoir flange portion 40 passes through the retaining member 42. Therefore, the reservoir flange portion 40 smoothly passes through the retaining member 42.

Therefore, resistance imparted by the retaining member 42 during insertion of the reservoir flange portion 40 can be reduced, making it easy to mount the reservoir 12 on the cylinder body 11.

As has been described above in detail, according to a preferred embodiment of the present invention, the annular retaining member, which has an outer diameter larger than the outer diameter of the reservoir flange portion and an inner diameter smaller than the outer diameter of the reservoir flange portion, is interposed between the engaging surface of the reservoir flange portion of the reservoir and the engaging surface of the seal member. Therefore, the reservoir is engaged with the seal member by means of the retaining member having an outer diameter larger than the outer diameter of the reservoir flange portion. Consequently, retention of the reservoir relative to the seal member and the cylinder body is markedly improved. Further, retention is improved at the connection between the leg portion and the mount portion which are provided for permitting communication between the reservoir and the cylinder body. Therefore, the structure of the master cylinder does not become complicated. Further, the retaining member can be interposed between the seal member and the reservoir flange portion by preliminarily disposing the retaining member within the opening of the mount portion of the cylinder body and attaching the seal member to the mount portion, followed by fitting the leg portion of the reservoir into the retaining member and the seal member by a single fitting operation. Therefore, the reservoir can be easily mounted on the cylinder body.

Therefore, retention of the reservoir relative to the cylinder body and the seal member can be very secure, without the occurrence of a substantial increase in cost.

The entire disclosure of Japanese Patent Application No. Hei 11-341434 filed on Nov. 30, 1999 including specification, claims, drawings and summary is incorporated herein by reference in its entirety.

What is claimed is:

1. A master cylinder comprising:

a master cylinder body;

a reservoir connected to the master cylinder body;

a leg portion formed in the reservoir so as to protrude toward the master cylinder body;

a mount portion formed in the master cylinder body so as to protrude toward the reservoir, the mount portion including an opening into which the leg portion is inserted; and a seal member adapted to be interposed between the leg portion and the mount portion when the leg portion is inserted into the opening of the mount portion so as to seal a gap between the master cylinder body and the reservoir, the leg portion extending beyond the seal member and including a flange portion formed along an outer circumference of a distal end thereof, the flange portion protruding outward and including an engaging surface facing the seal member, the seal member including an engaging surface formed at an end portion thereof, the engaging surface of the seal member facing the flange portion, the master cylinder further comprising a retaining member adapted to be fitted on an outer circumferential surface of the leg portion, the retaining member being provided between the engaging surface of the flange portion and the engaging surface of the seal member so as to prevent separation of the reservoir from the master cylinder body.

2. A master cylinder according to claim 1, wherein the retaining member has an outer diameter which is larger than an outer diameter of the flange portion and an inner diameter which is smaller than the outer diameter of the flange portion when the retaining member is provided between the engaging surface of the flange portion and the engaging surface of the seal member.

3. A master cylinder according to claim 2, wherein the retaining member comprises a ring-shaped elastic member and includes a slit for permitting an increase in diameter of the retaining member and elastic recovery of the retaining member.

4. A master cylinder according to claim 1, wherein the retaining member has two end faces, one of the end faces including a chamfer having a diameter decreasing toward the other end face of the retaining member, and the retaining member is disposed so that the chamfer is located on a reservoir side of the retaining member.

5. A master cylinder according to claim 1, wherein an outer diameter of one of end faces of the retaining member on a seal member side of the retaining member is smaller than an outer diameter of the other end face of the retaining member on a flange portion side of the retaining member, and a tapered surface is formed on an outer circumferential surface of the retaining member, due to a difference in outer diameter between the end faces.

6. A master cylinder according to claim 1, wherein an annular recess is formed at the distal end portion of the leg portion, the recess providing the engaging surface of the flange portion, wherein the retaining member comprises an annular body portion and a plurality of engaging pieces circumferentially arranged at predetermined intervals on an inner-diameter side of the body portion, the engaging pieces being inclined to the same side in an axial direction and extending radially inward, wherein an inner diameter defined as a diameter of a circle formed by a line connecting respective distal ends of the engaging pieces is smaller than an outer diameter of the flange portion and wherein an outer diameter of the body portion is larger than the outer diameter of the flange portion.

7. A master cylinder according to claim 1, wherein the flange portion protrudes from an outer circumferential surface of the leg portion on a side of a distal open end portion thereof and has an outer circumferential surface having a diameter which is larger than the outer circumferential surface of the leg portion, wherein the mount portion includes a claw portion, the claw portion protruding from an inner circumferential surface of a distal open end portion of the mount portion so as to have an inner circumferential surface of a diameter smaller than a diameter of an inner circumferential surface of a proximal side of the mount portion, and the claw portion has an opening into which the flange portion is inserted, wherein the seal member comprises an elastic member and wherein when the leg portion is inserted into the opening of the mount portion so that the outer circumferential surface of the leg portion on a proximal side relative to the flange portion faces an inner circumferential surface of the mount portion on a proximal side relative to the claw portion, the seal member is interposed between the outer circumferential surface of the leg portion on the proximal side relative to the flange portion and the inner circumferential surface of the mount portion on the proximal side relative to the claw portion.

8. A master cylinder according to claim 1, wherein each of the mount portion and the leg portion is in a cylindrical form.

* * * * *